Sept. 11, 1928.

L. H. HILL

TANK STRUCTURE

Filed Oct. 4, 1922

WITNESSES:

INVENTOR
Leland H. Hill.
BY
ATTORNEY

L. H. HILL

TANK STRUCTURE

Filed Oct. 4, 1922 7 Sheets-Sheet 4

WITNESSES:
H. B. Funk
W. R. Coley

INVENTOR
Leland H. Hill
BY
Wesley G. Carr
ATTORNEY

Sept. 11, 1928.

L. H. HILL

TANK STRUCTURE

Filed Oct. 4, 1922

WITNESSES:

INVENTOR
Leland H. Hill.
BY
ATTORNEY

Sept. 11, 1928.

L. H. HILL

TANK STRUCTURE

Filed Oct. 4, 1922

WITNESSES:
H. B. Funk.
W. R. Coley

INVENTOR
Leland H. Hill.
BY
Wesley G. Carr
ATTORNEY

Patented Sept. 11, 1928.

1,684,059

UNITED STATES PATENT OFFICE

LELAND H. HILL, OF WILKINSBURG, PENNSYLVANIA, ASSIGNOR TO WESTINGHOUSE ELECTRIC & MANUFACTURING COMPANY, A CORPORATION OF PENNSYLVANIA.

TANK STRUCTURE.

Application filed October 4, 1922. Serial No. 592,256.

My invention relates to tanks or containers and it has particular relation to expansion devices for tanks adapted to contain an oil-immersed electrical apparatus.

In the manufacture of electrical devices, such as transformers, oil circuit-breakers and like, that are submerged in an insulating or arc-quenching fluid, provision must be made for the expansion and contraction of the insulating fluid with changes in the temperature thereof.

It has been customary, heretofore, to provide overflow tanks having air vents or "breathers" of various types to accommodate the excess volume of oil that is caused by an increase in the temperature of the oil. The utilization of such devices, however, involves certain objectionable possibilities, which tend to seriously impair the efficiency and shorten the life of the apparatus.

The principal difficulty that is encountered is the effect of the atmosphere which is admitted through the "breathing" vent to the interior of the tank and into contact with the insulating oil contained therein. The air which thus obtains access to the interior of the tank, when such devices are employed, not only carries a considerable amount of moisture with it in suspension, which mingles with the oil and diminishes its dielectric properties, but the oxygen contained in the air effects oxidation of a portion of the oil.

The decomposition of the insulating oil results in a viscous deposit or "sludge" which settles upon the submerged apparatus and not only retards the radiation of heat therefrom but seriously impedes the circulation of the oil through the radiator elements, cooling ducts in the apparatus or other portions of the cooling system. Furthermore, in case a short-circuit or arc develops in the submerged apparatus, hydrogen and methane gases are liberated from the oil and combine with the oxygen in the air within the tank to form a blanket of highly explosive gas. In the event that a spark should occur within this gas blanket, an explosion would result, with consequent danger to life and property adjacent thereto.

Another serious difficulty, heretofore encountered, was that, even though the gas did not actually ignite during a short-circuit, the break-down caused such a rapid generation of the gases mentioned that the overflow device was unable to function rapidly enough to prevent either a rupture of the main tank, or of the overflow tank, or the bulging of the side walls and top thereof.

In order to avoid the difficulties just enumerated, various structures have been designed. Dehydrating devices have been disposed in the air vents, and, in some instances, it has been proposed that the air in the upper portion of the tank be replaced by an inert gas to provide a non-oxidizing blanket over the surface of the insulating oil to prevent explosions. However, in such apparatus it has been difficult to obtain and maintain a hermetically bolted closure or joint between the cover and the tank such as would prevent leakage caused by changes in pressure within the tank and the eventual development of an explosive mixture or the deterioration of the insulating oil.

Fluid seals have also been employed to prevent the atmosphere from coming into contact with the insulating oil and to isolate the air within the tank from the outside atmosphere; but, in none of these structures has provision been made for accommodating the rapid increase in the volume of the fluid contents of the tank, in the event of a short-circuit.

One of the objects of my invention is to provide a tank of the character described which is provided with an oil-sealed trap of sufficient capacity to accommodate, within itself, by virtue of the change of level of the sealing oil, a changed volume of the isolated fluid within the tank throughout the normal range of temperatures to which the installation is subject.

Another object of my invention is to avoid the dangers and disadvantages hereinbefore set forth, by providing a tank containing an expansible fluid, such as oil, an immersed electrical apparatus and a body of inert gas above the oil, and a liquid seal which not only excludes air from the interior of the tank and prevents the escape of the gas therefrom, under normal conditions, but which is of such dimensions as to be adapted to contain, within its displacement, the change of volume of the isolated fluid contents of the tank throughout the normal temperature range, as well as to permit of the rapid expansion of the fluid and the escape of an excess volume of gas liberated from the oil during a short-circuit in a submerged apparatus, if the invention is employed for such purposes.

A further object of my invention is to provide a tank, of the character described, which occupies a minimum amount of floor space, comprises relatively few parts, and may be handled and transported in an empty condition and be filled with an insulating oil at the location where the device is to be installed.

A still further object of the invention is to provide a tank having an oil-sealed trap that is of such area that the gas which escapes from the main tank, upon a change in the volume of the fluid contents of the tank, will cause a relatively small vertical displacement of the liquid level of the oil seal, whereby the pressure within the main tank is maintained substantially at atmospheric pressure and there is an elimination of the tendency of the gas within the tank to leak through the bolted connection between the tank body and the cover portion or for air to obtain access to the interior of the tank in the same manner when the fluid contents thereof contracts.

With such objects in view, as well as other advantages that may be incident to the utilization of the improvement, the invention consists in the parts and combinations thereof hereinafter set forth and claimed, with the understanding that the several necessary elements constituting the same may be varied in proportion and arrangement without departing from the nature and scope of the invention.

In order to make the invention more clearly understood, means are shown in the accompanying drawings for carrying the same into practical effect, without limiting the improvements, in their useful applications, to the particular constructions which, for the purpose of explanation, are made the subject of illustration.

Figure 1:
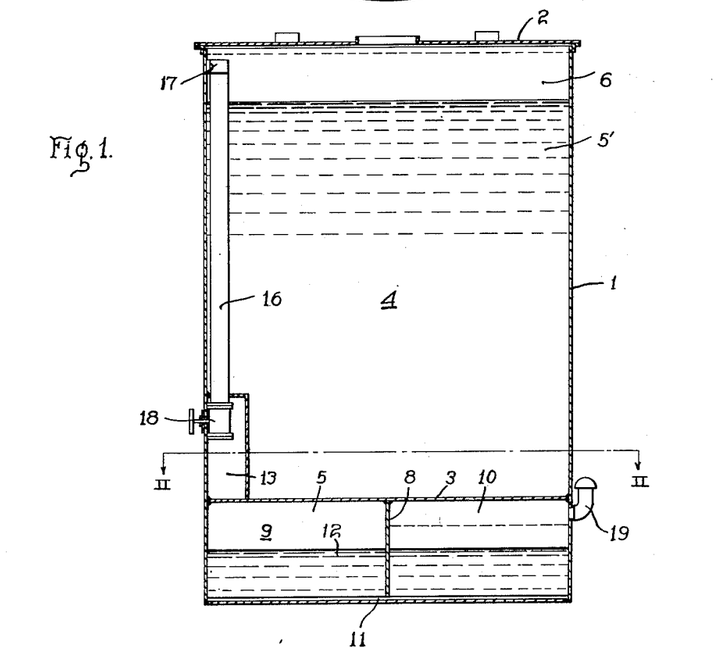
Figure 1 is a vertical longitudinal sectional view through a transformer tank constructed in accordance with my invention and in which an expansion chamber is provided in the lower portion thereof.
Figure 2:
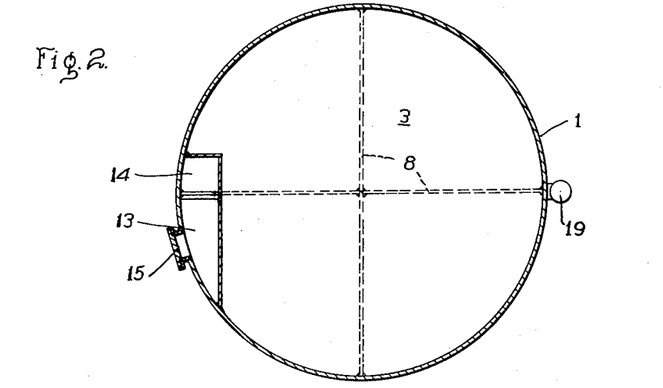
Fig. 2 is a horizontal sectional view taken on line II—II of Fig. 1.

Referring to the drawings and particularly to Figs. 1 and 2 thereof, a tank or container constructed in accordance with my invention is illustrated as comprising a main body portion 1 that is provided with a cover member 2. The interior of the body portion of the tank is divided horizontally, by means of a partition or false bottom 3, into an upper or main compartment 4 and a lower supplementary or expansion compartment 5. The main compartment 4 is adapted to contain an expansible liquid 5', such as the cooling and insulating or arc-quenching oil within which an electrical apparatus, (not shown) may be immersed, and an isolated atmosphere in the form of a blanket of inert gas 6 which completely fills the upper portion of the tank over the oil 5'.

The supplementary compartment 5, which functions as an expansion chamber for the apparatus, as will be hereinafter set forth, is divided transversely, by means of vertically extending diametrically disposed intersecting partitions 8, into chambers 9 and 10 which are in communication with each other through openings 11 that are provided in the partitions adjacent to the lower portions thereof. The chambers 9 and 10 are adapted to contain a liquid 12 which is of sufficient depth to close the openings 11, under normal operating conditions of the apparatus.

A chamber 13 which is adapted to contain a suitable deoxidizing agent (not shown) is provided in the lower portion of the main compartment 4 and adjacent to the side wall thereof and is in communication with one of the chambers 9 through an opening 14 that is provided in the partition 3. Access may be obtained to the interior of the chamber 13, for the purpose of inspecting or replacing the deoxidizing agent, by means of a hand hole 15.

Communication is established between the chamber 13 and the upper portion of the tank containing the inert gas 6, above the level of the oil 5, by means of a vertically extending pipe 16, the lower end of which projects into the chamber 13 and which may be supported, at its upper end, by means of a bracket 17 that is secured to the side wall of the tank. If desired, the pipe 16 may be supported by welding it to the wall of the tank.

The lower end of the pipe 16 is provided with a valve 18 by means of which communication may be interrupted between the gas-filled tank and the compartments 13 and 9 when it is desired to open the hand hole 15.

In operation, the supplementary chamber 5 is partially filled with a suitable sealing fluid, such as oil, to a level sufficient to close the openings 11 in the partition 8. The chamber 4 is then also partially filled with a cooling and insulating or arc-quenching oil, to the height indicated in Fig. 1 of the drawings. An electrical device, (not shown) is then submerged within the insulating oil and the cover 2 is secured in position.

A deoxidizing agent, such as phosphorus, is disposed within the chamber 13 and the valve 18 is opened after the hand-hole 15 is closed. The oxygen in the air that was initially sealed within the tank when the cover 2 was secured in position, being in communication with the deoxidizing agent disposed within the chamber 13 by means of the pipe 16, is rapidly extracted from the air, leaving an inert atmosphere of nitrogen gas within the tank.

When the fluid contents of the main tank expands with a rise in temperature, a portion of the inert gas contained in the upper portion of the tank is forced downwardly, through the pipe 16, chamber 13, and opening 14, into the upper portion of the chamber 9, causing the level of the liquid 12 therein to lower and that of the liquid contained in the chamber 10 to rise proportionately and against the action of gravity. As the level of the liquid contained in the chamber 10 rises, it will expel the air contained in the upper portion of the chamber 10 through a valve or port 19 to the outside atmosphere. When the oil 4 in the main body of the tank contracts with a fall in temperature, the liquid contained in the chambers 9 and 10, seeking a common level, will force the excess gas contained in the chamber 9 back through the pipe 16 into the upper portion of the main compartment 4.

Figure 3:
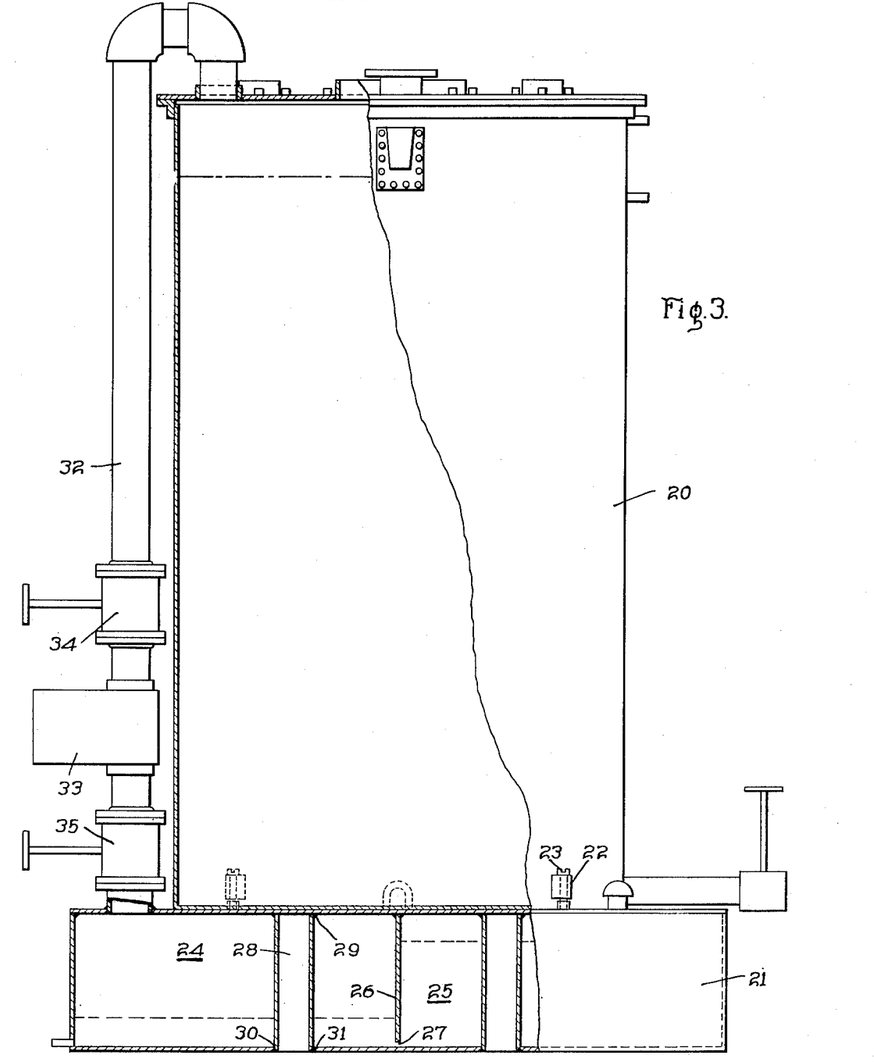
Fig. 3 is a view partially in side elevation and partially in vertical longitudinal section, of another form of transformer tank in which the main portion of the tank is constructed separately and is mounted directly upon the supplementary or expansion tank.
Figure 4:
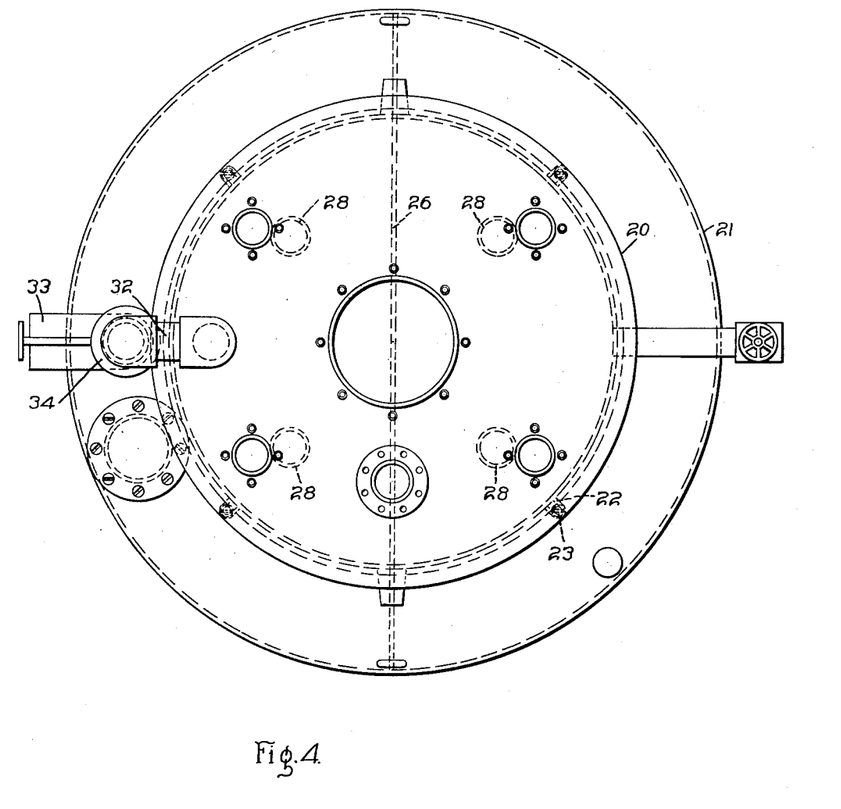
Fig. 4 is a plan view of the structure illustrated in Fig. 3.

In Figs. 3 and 4 is illustrated another form of the invention in which a main tank 20 is constructed separately and is mounted directly upon a supplementary tank 21. The two tanks are secured together, to provide a unitary structure, by means of a plurality of lugs 22 which are carried by, and spaced about, the lower portion of the side wall of the main tank 20 and through which bolts 23 are adapted to extend for attachment to the upper or top portion of the supplementary tank 21.

The supplementary tank 21, in this modification, is preferably of greater diameter than the main tank 20 and its outer or rim portion extends outwardly beyond the side walls of the main tank. The interior of the tank 21 is divided transversely into two compartments 24 and 25 by means of a vertically extending wall or partition 26 which is provided with an aperture 27 adjacent to the lower end thereof to afford communication between the compartments 24 and 25. The interior of the supplementary tank 21 is further provided with a plurality of vertically extending spaced columns 28 for assisting in supporting the weight of the main tank 20 which is carried entirely by the top portion of the supplementary tank 21. The columns 28 are preferably of tubular construction and are welded to the upper wall of the supplementary tank, as at 29, before the upper wall is secured to the side walls thereof. The lower extremities of the columns 28 project into apertures 30 that are provided in the lower wall of the supplementary tank and are exteriorly welded thereto, as at 31.

A pipe 32, which, in the present instance, is mounted exteriorly to the main tank 20, establishes communication between the gas-filled upper portion of the main tank and the compartment 24 of the supplementary tank 21. A chamber or housing 33, which is adapted to removably contain a deoxidizing or dehydrating agent, is disposed in communication with the pipe 32 and may be isolated from the main tank 20 and the supplementary tank 21, when it is desired to open the housing, by means of valves 34 and 35 that are disposed at each side of the housing 33.

Figure 5:
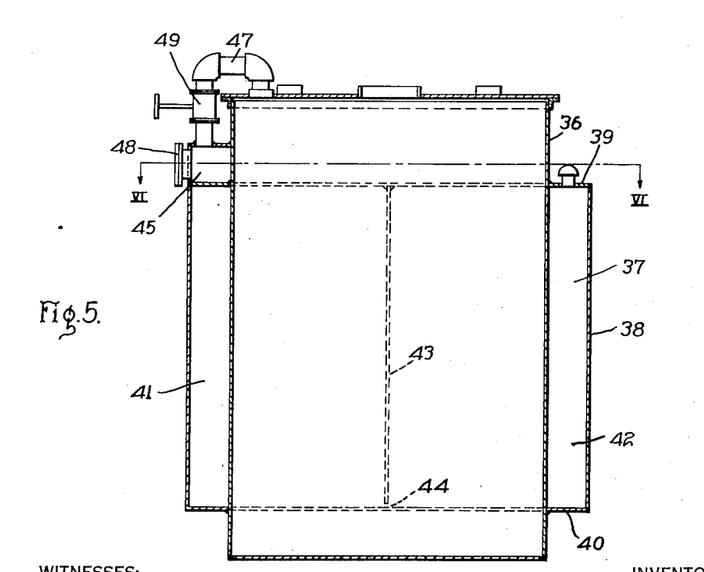
Fig. 5 is a vertical longitudinal sectional view of another form of the invention in which the expansion chamber is constructed externally to, and concentric with, the main tank.
Figure 6:
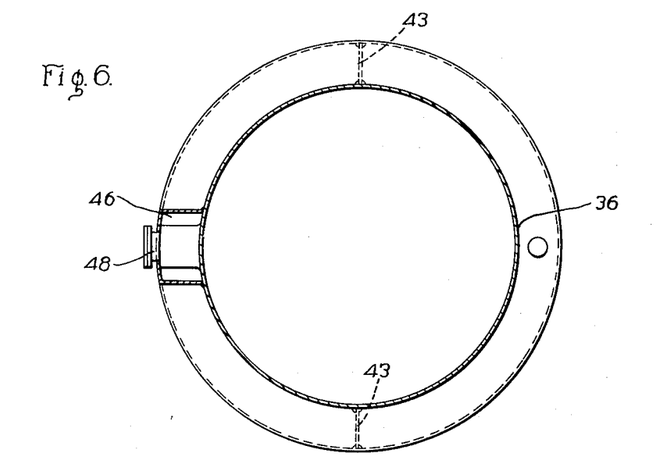
Fig. 6 is a horizontal sectional view taken on line VI—VI of Fig. 5.

In Figs. 5 and 6 is illustrated a further embodiment of my invention wherein a main cylindrical tank 36 is surrounded by an outer concentric supplementary tank 37. The tank 37 preferably comprises an outer cylindrical wall 38, which is spaced from the wall of the main tank 36 and is secured thereto, at the upper and lower portions thereof, by means of annular rings 39 and 40, respectively, which provide the top and bottom portions of the tank 37.

The interior of the tank 37 is divided into semi-cylindrical compartments 41 and 42 by means of two diametrically disposed vertically extending walls or partitions 43 which are severally provided with apertures 44 adjacent to the lower portion of the partitions to provide a communication between the compartments 41 and 42. A deoxidizing chamber 45 is provided on the upper wall of the tank 37, adjacent to the side wall of the main tank 36, and is in communication with the supplementary tank 37 through openings 46 that are provided in the upper wall 39. A hand hole 48 is provided in the chamber 45 through which a deoxidizing or dehydrating agent may be disposed in the chamber 45. A valve 49 is provided in the pipe 47 for the purpose of interrupting communication between the upper portion of the main tank 36 and the chamber 45, prior to opening the hand hole 48, to prevent gas contained in the upper portion of the tank 36 from escaping to the atmosphere or air from entering the tank.

Figure 7:
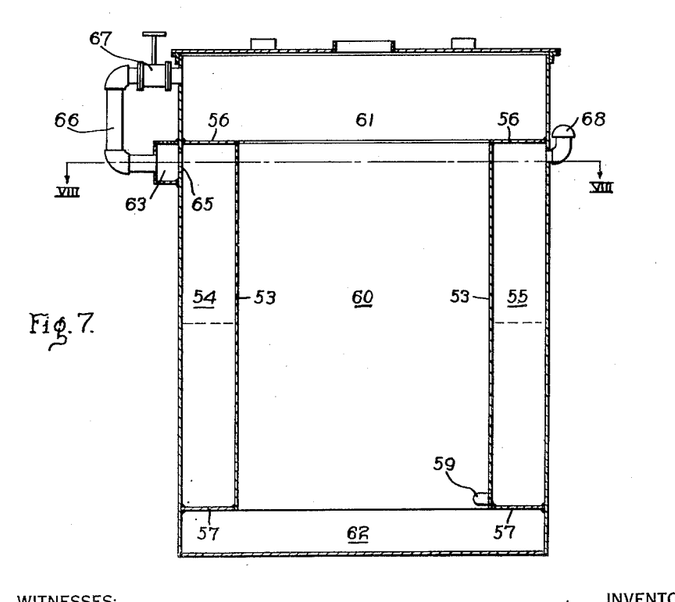
Fig. 7 is a vertical longitudinal sectional view of another form of my invention in which the portion of the tank that is adapted to contain the oil-immersed electrical apparatus, comprises a substantially rectangular casing disposed within a main cylindrical casing, the portions of the main cylindrical casing subtended by the walls of the inner casing constituting the over-flow or expansion chambers of the device.
Figure 8:
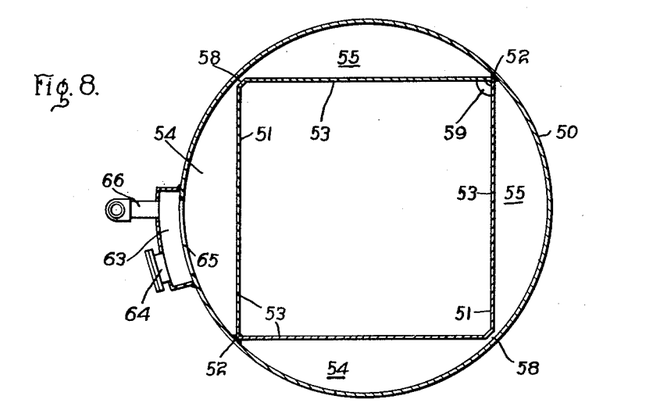
Fig. 8 is a horizontal sectional view taken on line VIII—VIII of Fig. 7.

In Figs. 7 and 8 is illustrated another form of my invention in which a cylindrical main tank 50 is provided with two vertically extending complementary co-acting members 51, of substantially V shape in cross section, which are secured together and to the wall of the main tank 50, as at 52. The sides 53 of the members 51 subtend a portion of the interior of the main tank 50 to provide oppositely disposed compartments 54 and 55. Segmental plates 56 and 57 are secured to the upper and lower edges of the side walls 53 and to the side wall of the main tank 50 to respectively provide the top and bottom portions of the compartments 54 and 55. The ridge portion of each of the complementary members 51, that is to say, the portion where the two sides 53 intersect, is spaced from the side wall of the main tank, as indicated at 58 in Fig. 8, to afford communication between the compartments 54 and 55 throughout their entire height. Each of the two groups of communicating compartments 54 and 55 is thus caused to function as a single compartment. Communication is established between these two groups of compartments by means of a pipe 59 that is disposed adjacent to the bottoms thereof.

The overall height of the compartments 54 and 55 is less than that of the main tank 50 and the compartments are so disposed with respect to the main tank as to provide a substantially rectangular central portion 60, which communicates with cylindrical, upper and lower portions 61 and 62, respectively, of greater cross-sectional areas. The purpose of this particular construction is to permit radiator elements to be exteriorly mounted upon the tank 50 and communicate directly with the interior thereof.

A chamber 63 is supported on the side wall of the tank 50 and, as in the structures previously described, is adapted to contain a deoxidizing or dehydrating material. The chamber 63 is provided with a hand hole 64 and communicates with one of the compartments 54 through an opening 65 in the side wall of the tank 50. Communication is established between the chambers 63 and the gas-filled upper portion of the tank 50 by means of a pipe 66 and valve 67.

In this structure, the expansion of the fluid contents in the main tank 50 forces a quantity of the gas contained therein through the pipe 66 and valve 67 into the chamber 63 and thence, through the opening 65, into the compartments 54 and 55. The increased volume of the gas in these compartments lowers the level of the liquid therein and forces a corresponding amount of the liquid through the pipe 59 into the compartments 54 and 55 of the adjacent group, thereby raising the liquid level in these latter compartments and expelling the air above the liquid through a breathing vent 68 to the outside atmosphere.

When the fluid content of the main tank 50 contracts upon a lowering of temperature, the hydrostatic head in the compartments 54 and 55 forces the gas, initially ejected from the main tank, back into it.

Figure 9:
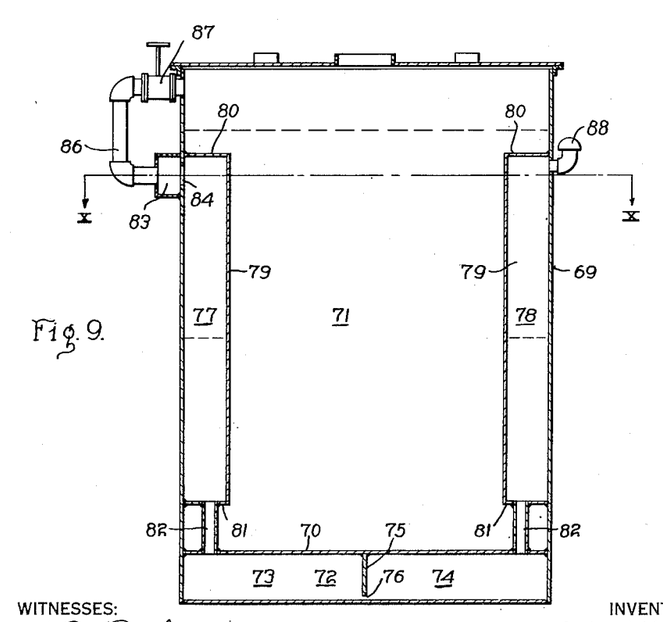
Fig. 9 is a vertical longitudinal sectional view of still another form of my invention in which the expansion chambers are formed by vertically extending walls disposed within an outer cylindrical wall and which subtend a portion of the interior thereof to provide the expansion chambers.
Figure 10:
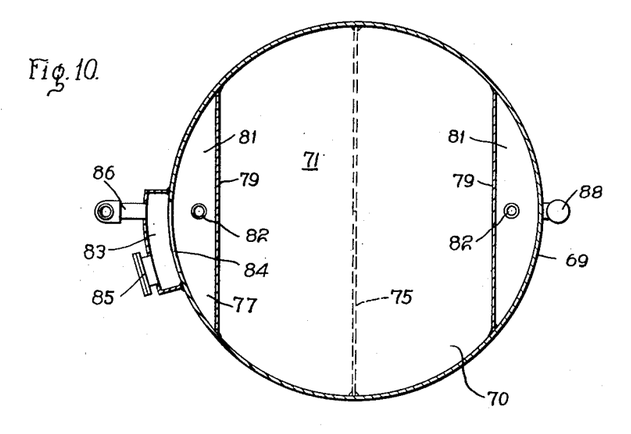
Fig. 10 is a horizontal sectional view taken on line X—X of Fig. 9.

In Figs. 9 and 10 is illustrated a further embodiment of my invention in which a main tank 69 is provided with a horizontally extending false bottom or partition 70 which divides the interior thereof into an upper main compartment 71 and a lower supplementary compartment 72. The lower compartment 72 is divided transversely into chambers 73 and 74 by means of a vertically extending transverse partition 75. Communication between the chambers 73 and 74 is effected through an opening 76 that is provided in the lower portion of the partition 75.

The interior of the upper or main compartment 71 is provided with two oppositely disposed chambers 77 and 78. These chambers are each fromed by a vertically extending wall 79 which is secured to the wall of the main tank 69 along its vertical edges and by segmental top and bottom portions 80 and 81, respectively. Communication is established between the chambers 73 and 77 and between the chambers 74 and 78 by means of vertically extending pipes 82.

A deoxidizing chamber 83 is supported on the side wall of the main tank 69 and communicates with the interior of the chamber 72 through an opening 84. The chamber 83 is provided with a hand hole 85 and is also in communication with the gas-filled upper portion of the main tank 69 through a pipe 86 and valve 87.

When the fluid content of the main tank 69 expands with a rise in temperature, a portion of the gas in the upper portion of the tank 69 will be forced through the pipe 86, valve 87, chamber 83 and opening 84 into the chamber 77. This excess quantity of gas that is forced into the chamber 77 causes a quantity of the liquid contained in the lower portion of the chamber 77 to be forced through the pipe 82 into the chamber 73 and thence through the opening 76 in the partition 75 into the chamber 74. From the chamber 74 the liquid passes vertically through the pipe 82 and into the chamber 78 and causes the liquid contained therein to rise above its normal level. This rise of the liquid level in the chamber 78 forces the air contained in the upper portion thereof through a breathing vent 88 to the outside atmosphere.

When the fluid contents of the chamber 71 contracts with a lowering in temperature, the difference in the hydrostatic heads of the liquid contained in the chambers 77 and 78 causes the excess quantity of gas that was forced into the upper portion of the chamber 77 when the fluid in the main tank 71 expanded, to be again forced back into the upper portion of the main tank 71.

Figure 11:
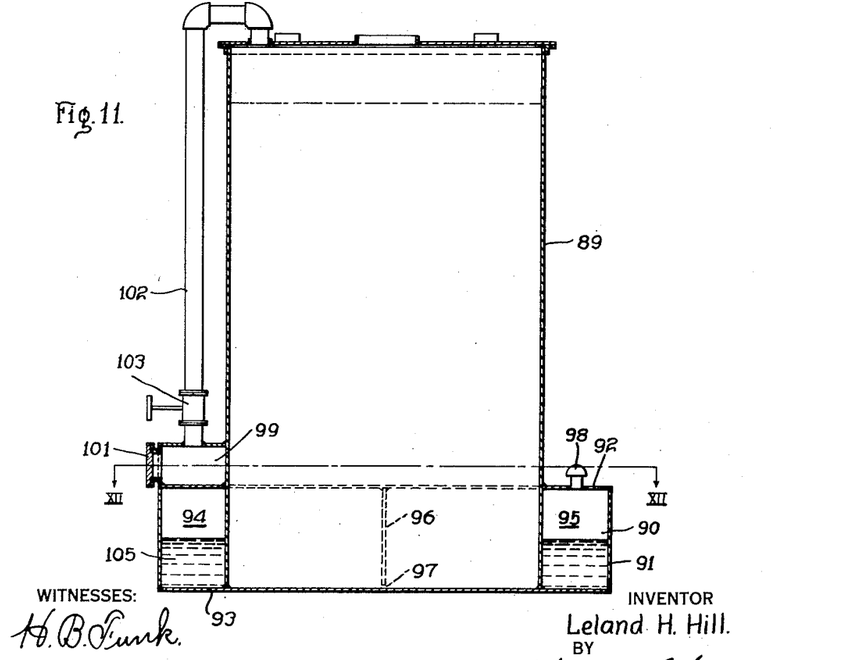
Fig. 11 is a vertical longitudinal sectional view of a further form of my invention in which the expansion chamber is in the form of a ring surrounding the lower portion of the main tank.
Figure 12:
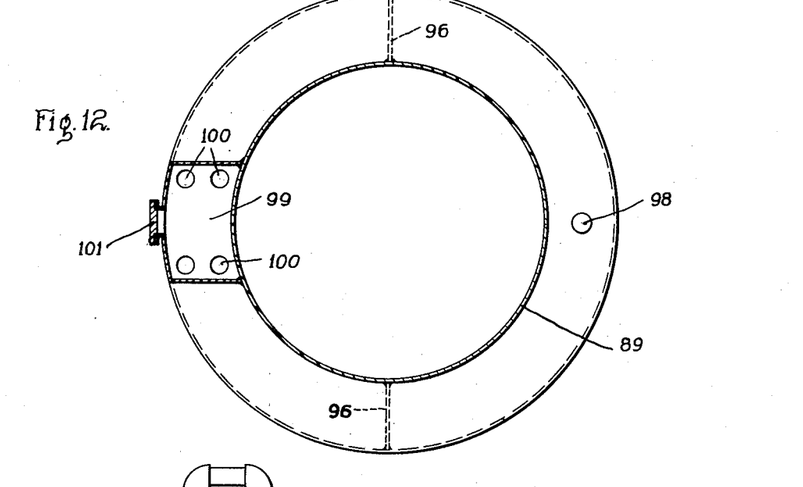
Fig. 12 is a horizonal sectional view taken on line XII—XII of Fig. 11.

In Figs. 11 and 12 is illustrated a further modification of my invention in which the lower portion of a cylindrical main tank 89 is surrounded by a supplementary tank 90. In this structure, the supplementary tank 90 comprises an outer cylindrical wall portion 91, which is spaced from, and is concentric with the wall of the main tank 89, and top and bottom portions 92 and 93, respectively. The top portion of the tank 90 is in the form of a ring that is welded or otherwise suitably secured to the wall of the main tank 89 and to the wall 91 of the supplementary tank 90. The bottom portion 93 of the supplementary tank is preferably formed from the same plate that comprises the bottom portion of the main tank 89 and is of a diameter greater than that of the main tank.

The interior of the supplementary tank 90 is divided into two compartments 94 and 95 by means of two diametrically disposed walls or partitions 96 which are both provided with apertures 97 adjacent to the lower portions thereof for effecting communication between the respective compartments 94 and 95. The compartment 95 communicates with the outside atmosphere through a breathing vent 98 and the compartment 94 communicates with a deoxidizing and dehydrating chamber 99, which is provided on the top portion 92 of the supplementary tank 90, through openings 100 that are located in said top portion.

The chamber 99 is provided with a hand hole 101 and communicates with the gas-filled upper portion of the main tank 89 through a pipe 102 and a valve 103. As in the structures previously described, the fluid content of the main tank is isolated from the atmosphere by means of a suitable liquid 105 that is contained in the supplementary tank 90 and which is of sufficient depth in both of the compartments 94 and 95 to effectually close the communicating aperture 97 to the passage of air from the compartment 95 to the gas-filled compartment 94.

The operation of this particular form of the invention is substantially the same as that of the forms hereinbefore described. When the fluid content of the main tank expands, the excess pressure causes the level of the liquid in compartment 94 to decrease and that of the liquid in compartment 95 to increase. Upon the contraction of the fluid content of the main tank, the liquid in the compartments 94 and 95 will seek a common level and cause the return of the excess volume of gas that is contained in the compartment 94 to the upper portion of the main tank. If, on the other hand, the apparatus be inoperative and subjected to unusually cold weather, the fluid content of the main tank may contract. In such event, the decreased pressure in the main tank will be unbalanced by atmospheric pressure, and the liquid level in the compartment 95 will accordingly be raised and that in the compartment 94 will be lowered.

In all of the various structures hereinbefore described, the fluid content of the main tank is, at all times, isolated from the atmosphere and, at the same time, adequate provision is made for the expansion and contraction of the contents of the main tank. The inert gas formed in the upper portion of the main tank by the deoxidizing agent that is disposed in the deoxidizing chamber preserves the oil and prevents the formation of the explosive mixtures heretofore encountered. Furthermore, the gas is prevented from escaping from the tank and from becoming contaminated by contact with air. If a small quantity of air should, however, in some manner obtain access to the interior of the tank, the deoxidizing agent will remove the oxygen therefrom and augment the supply of inert gas within the tank.

I claim as my invention:

1. A tank comprising a main portion containing an expansible fluid, a supplementary portion adapted to contain a liquid for sealing the contents of said main portion from the atmosphere, means for establishing communication between said main and said supplementary portions whereby a change in the volume of the fluid contained in said main portion will cause a change in the level of the liquid contained in said supplementary portion deoxidizing means for the fluid content of said tank, and a receptacle adapted to contain said deoxidizing means.

2. A tank comprising a main portion containing an expansible fluid, a supplementary portion adapted to contain a liquid for sealing the contents of said main portion from the atmosphere, means for establishing communication between said main and said supplementary portions where by a change in the volume of the fluid contained in said main portion will cause a change in the level of the liquid contained in said supplementary portion, means for deoxidizing the fluid content of said tank, and a chamber disposed in the line of communication between said portions and adapted to contain said deoxidizing means.

3. A tank comprising a main portion containing an expansible fluid, a supplementary portion containing a liquid for sealing the contents of said main portion from the atmosphere, means for establishing communication between said main and said supplementary portions whereby a change in the volume of the fluid contained in said main portion will cause a change in the level of the liquid contained in said supplementary portion, means for deoxidizing the fluid content of said tank, a chamber adapted to contain said deoxidizing means, and means for isolating said chamber from said portions.

4. A tank comprising a main portion containing an expansible fluid, a supplementary portion containing a fluid seal for isolating the fluid contained in said main portion from the outside atmosphere, means for establishing communication between said main portion and said supplementary portion for permitting the expansion and contraction of the fluid content of said main portion with changes in the temperature thereof, means for deoxidizing the isolated atmosphere in the interior of said tank, a compartment in communication with the interior of said tank and adapted to contain said deoxidizing means, and a valve mechanism for interrupting communication between the main portion of said tank and said compartment.

In testimony whereof I have hereunto subscribed my name this second day of October, 1922.

LELAND H. HILL.